May 7, 1929.  H. H. BOYCE  1,711,669
MOTOR HEAT INDICATOR
Filed July 12, 1927    2 Sheets-Sheet 1
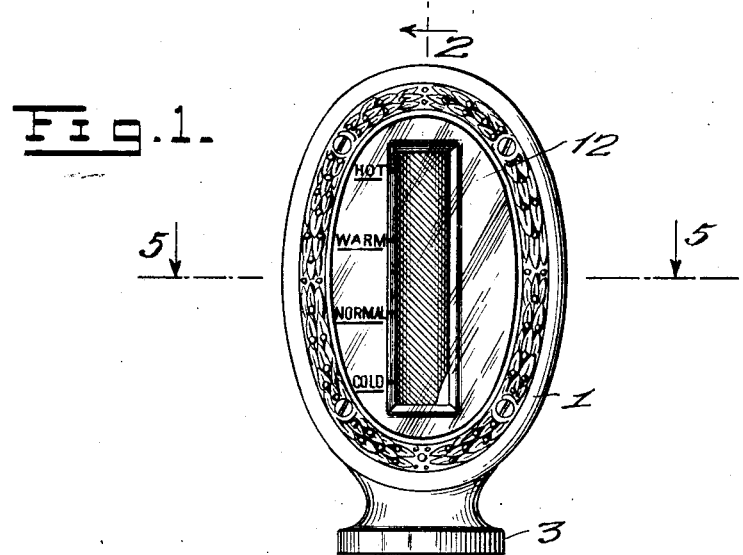
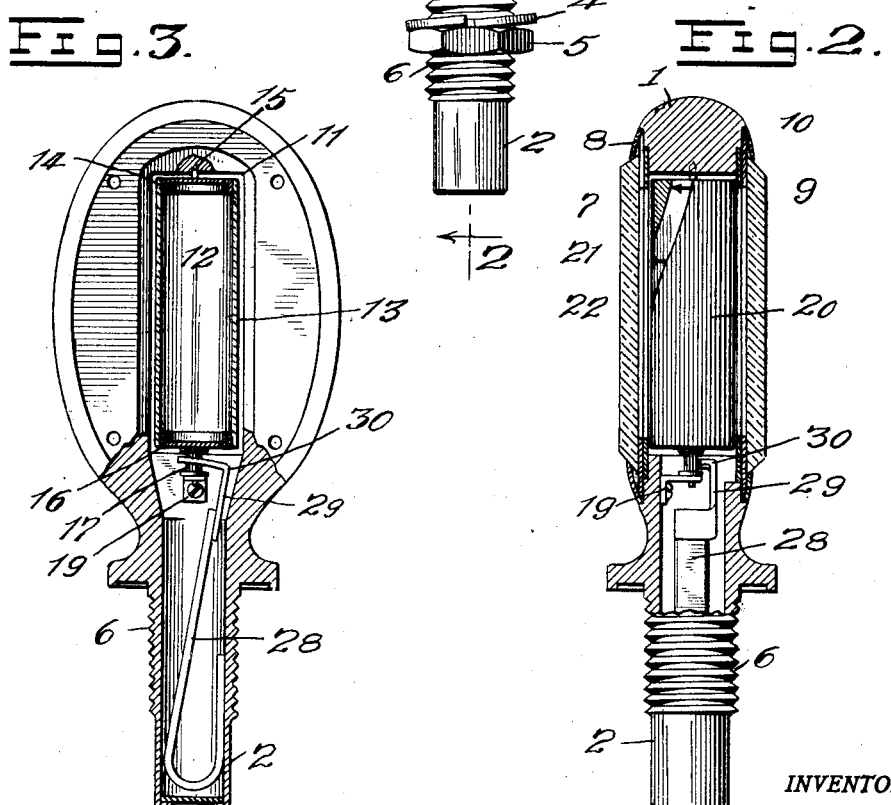
INVENTOR
HARRISON H. BOYCE
BY
ATTORNEY May 7, 1929. H. H. BOYCE 1,711,669
MOTOR HEAT INDICATOR
Filed July 12, 1927 2 Sheets-Sheet 2
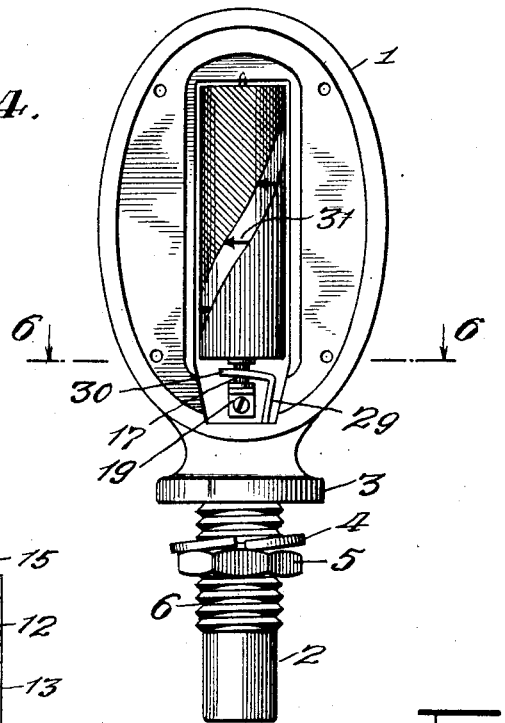
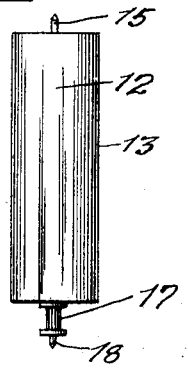
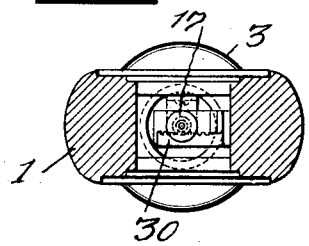
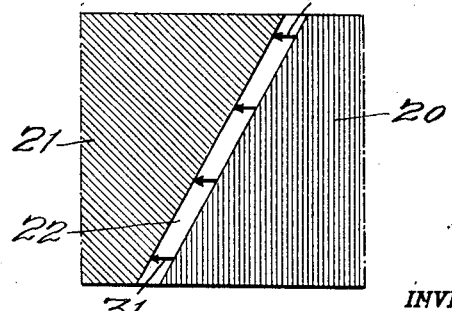
INVENTOR
HARRISON H. BOYCE
BY
ATTORNEY Patented May 7, 1929.

1,711,669

UNITED STATES PATENT OFFICE.

HARRISON HURLBERT BOYCE, OF JERICHO, NEW YORK.

MOTOR HEAT INDICATOR.

Application filed July 12, 1927. Serial No. 205,063.

This invention relates to devices for indicating the heat condition within the cooling systems of internal combustion engines especially internal combustion engines of the automotive type.

One of the objects of this invention is to provide in a device for indicating the heat condition within an automotive radiator, an indicating element of rotary type having a drum bearing a plurality of colored portions separated from each other by a spiral portion contrasting with each of said colors.

Another object of this invention is to provide in a device for indicating the heat condition within an automotive radiator, an indicating element of rotary type having a drum bearing a plurality of colored portions separated from each other by a spiral portion contrasting with each of said colors and indicia on the spiral separating portion.

Another object of this invention is to provide a device for indicating the heat condition within an internal combustion engine cooling system having a rotary indicating drum provided with a plurality of different colored portions separated by a spiral colored portion contrasting with each of said colored portions and a graduated dial for said instrument having an aperture and graduations along the side thereof adjacent said drum.

Another object of this invention is to provide a device for indicating the heat condition within an internal combustion engine cooling system having a rotary indicating drum provided with a plurality of different colored portions separated by a spiral colored portion contrasting with each of said colored portions and a graduated dial for said instrument having an aperture and graduations along the side thereof adjacent said drum the graduations on the dial also cooperating with the indicia on the spiral portion of the indicating drum.

Another object of this invention is to provide in a device for indicating the heat condition within an automotive radiator an indicating drum of transparent or translucent material having transparent or translucent colored areas separated by a colored portion contrasting with said colored areas.

Another object of this invention is to provide in a device for indicating the heat condition within an automotive radiator an indicating drum of transparent or translucent material having a portion thereof colored with a distinctive color such as red and another portion with a distinctive color such as green and a spiral band separating said colored portions and of a color contrasting with each.

Another object of this invention is to provide a simplified indicating device of the heat condition within an automotive internal combustion engine cooling system which is rugged in construction, efficient in operation, and cheap of manufacture.

Other objects and advantages will become apparent from the following specification, claims and appended drawings in which:—

Fig. 1 is a front elevation of my device.

Fig. 2 is a cross-sectional view on the line 2—2 of Fig. 1.

Fig. 3 is a front elevational view with parts removed and parts in section to more clearly show the construction of my device.

Fig. 4 is a front elevational view of my device with parts removed to more clearly illustrate my invention.

Fig. 5 is a cross-sectional view on the line 5—5 of Fig. 1.

Fig. 6 is a cross-sectional view on the line 6—6 of Fig. 4.

Fig. 7 is a detail of the indicating drum construction.

Fig. 8 is a development of the cylindrical surface of said drum showing the relative position of the colored positions and the indicia on the separating band between the colored portions.

As is clearly shown in the drawings, my device comprises a casing 1 having a downwardly extending hollow stem 2 formed integral therewith. A base flange 3 is formed on the upper end of the hollow stem and integral therewith and with the casing 1. My device is adapted to be secured to an automotive radiator cap or closure device (not shown in the drawings) in the following manner. The stem 2 is adapted to pass through an aperture in said radiator cap and to be securely fastened thereto with the base flange 3 pressing against the outer surface thereof by a lock washer 4 and lock nut 5 cooperating with a threaded portion 6 of the hollow stem 2.

The casing 1 is provided with a front bezel 7 retained in place upon said casing by retaing ring 8 and with a rear bezel 9 retained in place by a retaining ring 10. If desired, the retaining rings may be of ornamental design, as shown in Fig. 1.

The casing 1 is provided with a vertically extending elongated central aperture 11. An indicating element in the form of a drum 12 is mounted within this aperture 11 in the following manner. The drum 12 is formed of a transparent or translucent cylinder 13 in the upper end of which is secured a member 14. A pin 15 projects upwardly from the center of the member 14 and enters a recess in the upper end of the aperture 11. The lower end of the cylinder 13 is closed by a member 16 secured in place in any suitable manner. A pinion 17 extends downwardly from the center of this member 16 and is provided with a short downwardly extending shaft or pin 18. A foot or bracket 19 is secured to the casing 1 at the throat of the hollow stem 2 and is provided with an aperture through which the shaft 18 projects. The drum 13 is thus mounted for rotation on its axis in the aperture 11 of the casing 1, as is clearly shown in Figs. 2 and 3.

The surface of the drum 13 is divided into three areas as is clearly shown in Fig. 8. One of these areas is colored red, another green and the third may be left uncolored or colored with a contrasting color to the other portions. As will be readily seen from Figs. 4 and 8, the uncolored band extends in a spiral manner from the bottom to the top of the drum. The red and green portions extend around the drum from the spiral band and meet in a vertical line substantially opposite the center of this band. I have designated the red portion by the numeral 20, the green portion by the numeral 21, and the separating band portion by the numeral 22. The colored areas may be created on the cylindrical portion 13 of the drum 12 in a great many different ways such as by transparent paint or dyes or by fixing thereto a colored transparent or translucent sheet of a material such as celluloid.

Between the front and back bezels 12 and the casing 1, I have provided dials designated respectively as 23 and 24. These dials are provided with elongated apertures adjacent the drum 12 as is shown in Figs. 1 and 5. Between the front dial and drum 12 is a sub-dial 25 formed with an aperture substantially co-extensive with the aperture in the front dial 23. The sides of this aperture are provided with wings 26 extending inwardly towards the drum 12 and substantially radially of the drum as shown in Fig. 5. The casing 1 is provided with a recess to receive this sub-dial 25. A sub-dial 27 is received in recess in the casing 1 and provided with an aperture substantially co-extensive with the aperture in the rear dial 24.

Within the hollow stem 20 a heat responsive device in the form of a thermostatic element 28 is mounted. This heat responsive device extends upwardly in the hollow stem and is provided at its upper end with an extension 29 as shown in Figs. 3 and 4. This extension is provided with a laterally extending foot 30 formed with rack teeth engaging the pinion 17 secured to the drum 12. The heat responsive element 28 when subject to changes in heat condition will displace the member 29 and cause the rack teeth thereon to rotate the pinion 17 and thus rotate the drum 12 bringing various portions thereof before the aperture in the front dial 25 in accordance with various heat conditions to which the heat responsive element is subject.

The front dial 23 is provided with graduations indicating various heat conditions such as hot, warm, normal, cold, and the dial is marked with these words adjacent the corresponding graduations, as shown in Fig. 1. On the spiral separating portion of the drum 12 indicating arrows designated by the numeral 31 are positioned opposite the various graduations of the dial 23, as is clearly shown in the drawings. As the drum is rotated, these arrows will, of course, be presented before the aperture in the front dial and adjacent the graduations on said dial. Due to the spiral nature of the separating portion of the drum 12 only one arrow will be fully disclosed before the aperture at a single time and thus the operator will be apprised of the heat condition at this point.

It will be apparent from the foregoing description that as the drum is rotated in accordance with changes in the heat condition to which the thermostatic element 28 is subject, the amount of each colored portion presented before the aperture in the front dial 23 will vary in accordance with the direction of rotation. Thus, if the drum rotates in one direction for instance, to the right, as viewed in Fig. 1, more of the green portion will be presented and less of the red, while, if the drum is rotated in the reverse direction, the amount of green will be diminished and the area of the red increased. Also the portion of the separating band between the green and the red visible before the aperture will progress upwardly upon a rotation of the drum to the left as viewed in Fig. 1 and downwardly upon a rotation of the drum to the right.

The drum will, of course, be illuminated by the light rays entering the aperture in the rear dial and passing thru the drum. In average driving ranges, the rear juncture between the red and green portions will lie before the rear aperture and will therefore be visible through the front aperture. As the heat condition rises above average, the juncture point will, of course, be moved away from in front of the rear aperture and the green portion will entirely cover said aperture. In temperatures below the average, the juncture point will be moved in the reverse direction from in front of the rear aperture and said aperture will be entirely covered by the red portion of the drum. Since the light passing thru the transparent drum must pass thru the rear aperture, it is evident that a marked contrast will be visible between temperatures above and below average due to the respective color presented before the rear aperture. It is apparent that the indicating element of my device presents a plurality of separate indications, one of which is a colored area indication, one a spiral band indication, one a graduated scale indication, and another a color change indication.

Various changes in the construction of the embodiment illustrated in the drawings may be made without departing from the spirit of the invention, and I do not desire, therefore, to limit myself to the specific construction shown and described, but to interpret the invention broadly within the scope of the appended claims.

What I claim as my invention is:

1. In a device for indicating the heat condition within an automotive internal combustion engine cooling system, means responsive to changes in heat condition within said cooling system, an indicating element positioned thereby including a drum having a plurality of colored areas and a contrasting separating diagonal band separating said areas.

2. In a device for indicating the heat condition within an automotive internal combustion engine cooling system, an indicating element including a drum having a plurality of colored areas abutting in a line parallel to the drum axis at one point on said drum and separated by a diagonal band at another point on said drum.

3. In a device for indicating the heat condition within an automotive internal combustion engine cooling system, an indicating element including a drum having a plurality of colored areas abutting in a line parallel to the drum axis at one point on said drum and separated by a diagonal band at another point on said drum, and indicia on said separating band.

4. In a device for indicating the heat condition within an automotive internal combustion engine cooling system, an indicating element including a drum having a plurality of colored areas abutting in a line parallel to the drum axis at one point on said drum and separated by a diagonal band at another point on said drum, indicia on said separating band, and a dial adjacent said drum and having graduations cooperating with said indicia.

5. In a device for indicating the heat condition within an automotive radiator, a casing, a transparent drum indicating element within said casing and operatively connected to a heat responsive device responsive to changes in heat condition within said radiator, a dial for said casing having an aperture adjacent said drum and a sub-dial between said first dial and said drum and provided with wings extending inwardly toward said drum whereby the portion of said drum visible thru said dial is accurately defined.

6. In a device of the class described, an indicating element including a drum having areas of two contrasting colors and an area therebetween having indicia thereon.

7. In a device of the class described, an indicating scale, an indicating element including a drum having areas of contrasting colors and an area therebetween having indicia cooperating with said scale.

8. In a device for indicating the heat condition within an automotive radiator, a casing, an aperture therein, a drum within said aperture, means to rotate said drum in accordance with the heat condition within said radiator, a band on said drum extending diagonally from the bottom to the top thereof, and an indicating scale cooperating with said diagonal band, said band being provided with a plurality of arrows adapted to appear in definite order to indicate the heat conditions.

9. In a device for indicating the heat condition within an automotive radiator, a drum, means to position said drum in accordance with the heat condition within said radiator, a diagonal band on said drum extending diagonally from the bottom to the top thereof, an indicating scale cooperating with said diagonal band, and indicia on said band cooperating with said scale.

In testimony whereof I have affixed my signature to this specification.

HARRISON H. BOYCE.